(12) United States Patent
Takahashi (10) Patent No.: US 7,414,668 B2
(45) Date of Patent: Aug. 19, 2008

(54) DIGITAL CAMERA SYSTEM

(75) Inventor: Kimihide Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 758 days.

(21) Appl. No.: 10/720,349

(22) Filed: Nov. 25, 2003

(65) Prior Publication Data

US 2004/0105024 A1  Jun. 3, 2004

(30) Foreign Application Priority Data

Nov. 26, 2002  (JP)  ............................. 2002-342341

(51) Int. Cl.
*H04N 5/225* (2006.01)
(52) U.S. Cl. .................................... 348/373
(58) Field of Classification Search .............. 348/207.1, 348/333.01, 272–276, 373–376
See application file for complete search history.

(56) References Cited

U.S. PATENT DOCUMENTS 5,475,382 A * 12/1995 Yuen et al. ............. 340/825.72
5,715,020 A * 2/1998 Kuroiwa et al. ............. 348/734
6,297,802 B1 * 10/2001 Fujioka ....................... 345/156
6,405,049 B2 * 6/2002 Herrod et al. ................ 455/517
2003/0117499 A1 * 6/2003 Bianchi et al. ........... 348/211.2
2003/0160890 A1 * 8/2003 Caspe et al. ................ 348/372

FOREIGN PATENT DOCUMENTS

JP  2002-232769 A  8/2002

* cited by examiner

*Primary Examiner*—Tuan Ho
*Assistant Examiner*—Tuan H Le
(74) *Attorney, Agent, or Firm*—Sughrue Mion, PLLC (57) ABSTRACT

A digital camera system comprises a digital camera and a cradle unit, which are electrically connected via a connector and a connection terminal. The cradle unit is provided with an operation-code generator and a light emitter. When an external display mode is selected by operating an operational section of the digital camera, the operation-code generator generates an operation code as an analog signal. This analog signal is sent to the light emitter. Upon receiving the analog signal, the light emitter emits an infrared signal of the operation code toward a TV monitor to change the TV monitor into an external input condition.

12 Claims, 8 Drawing Sheets

DIGITAL CAMERA SYSTEM

BACKGROUND OF THE INVENTION

1. Field of the Invention

The present invention relates to a digital camera system in which a digital camera is connected to a cradle via which data is transferred to an external apparatus and an image is outputted to an external display.

2. Description of the Related Art

In recent years, a digital camera is not only used alone but also often connected to an external apparatus of a personal computer (hereinafter, abbreviated as PC) and so forth to transfer image data to the PC. The digital camera is sometimes connected to an external display of a TV monitor and so forth to output an image and to show it on a large display.

Meanwhile, the digital camera has great advantages in right weight, small size and good portability. Thus, it is preferable to make a number of parts, which are built in a camera body, as small as possible. Many of the digital cameras accompany appurtenances called as cradle assembly and docking station, for example. Such an appurtenance is provided with a power-supply function and a relay function including an interface (I/F) for connection with the PC and the TV monitor, such as described in Japanese Patent Laid-Open Publication No. 2002-232769. In the following description, the cradle assembly and the docking station are designated as a cradle unit.

In a case that the above-mentioned cradle unit pertains to the digital camera, the cradle unit is provided with an attachment portion, a shape of which corresponds to a bottom portion of a camera body. By setting the digital camera to the attachment portion, a connector provided at the digital-camera side is joined to a connection terminal provided at the cradle-unit side so that the digital camera is electrically connected to the cradle unit. Since an electric power is supplied from the cradle unit to the digital camera in this state, it is possible to use the digital camera for a long time without caring the remainder of battery.

However, as to the digital camera described in the above-noted Publication No. 2002-232769, when the digital camera is set to the cradle unit via which the digital camera is connected to both of the PC and the TV monitor, it is necessary to change over the TV monitor to an external-input condition so as to display an image, which is outputted from the digital camera, on the TV monitor. Moreover, when the power supply is turned off, it is necessary to turn on it. Much time is taken for carrying out such operations of the TV monitor in addition to a booting operation and other operations of the PC and the digital camera. Before displaying the image on the TV monitor, it is necessary to perform many operations. Further, small operation buttons provided on the digital camera have to be handled in the state that the digital camera is set to the cradle unit. This causes to take much more time for the operation.

SUMMARY OF THE INVENTION

In view of the foregoing, it is a primary object of the present invention to provide a digital camera system in which it is easily operated to display an image on an external display connected to a digital camera via a cradle unit.

It is a second object of the present invention to provide a digital camera system in which a digital camera set to a cradle unit is easily and securely operated.

In order to achieve the above and other objects, in a first embodiment of the digital camera system according to the present invention, the digital camera is capable of selecting one of modes including an external display mode for displaying an image on an external display. Further, the cradle unit to which the digital camera is electrically connected is provided with an operation-code generator to generate an operation code for operating the external display. The cradle unit is also provided with a transmitter for transmitting the operation code to the external display by using a radio transmission medium. When the digital camera is set to the cradle unit and the external display mode is selected, the operation code is sent to put the external display in an external input condition for displaying an image thereon.

In a second embodiment of the digital camera system, the digital camera is capable of selecting one of modes including an external display mode for displaying an image on an external display. Further, the cradle unit is electrically connected to the digital camera. The digital camera is provided with an operation-code generator to output an operation code, which is used for operating the external display, as digital data. The cradle unit is provided with a modulation circuit for converting the operation code from the digital data to an analog signal. The cradle unit is also provided with a transmitter, which transmits the operation code to the external display on the basis of the analog signal by using a radio transmission medium. When the digital camera is set to the cradle unit and the external display mode is selected, the operation code is sent to put the external display in an external input condition for displaying an image thereon.

In a third embodiment of the digital camera system, the digital camera is capable of selecting one of modes including an external display mode for displaying an image on an external display. Further, the cradle unit is electrically connected to the digital camera. The digital camera system of this embodiment includes a remote controller for sending an operation code, which is used for operating the digital camera, by utilizing a radio transmission medium. The digital camera is provided with an operation-code generator to produce an operation code, which is used for operating the external display, as digital data. The digital camera is also provided with a decoder for converting the operation code of the externally inputted digital data into a control signal. The cradle unit is provided with a receiver, a demodulation/modulation circuit, and a transmitter. The receiver receives the operation code sent from the remote controller and outputs an analog signal. The demodulation/modulation circuit converts the operation code, which is sent from the operation-code generator of the digital camera, from the digital data to an analog signal. Moreover, the demodulation/modulation circuit converts the operation code, which is received by the receiver, from the analog signal to the digital data. On the basis of the analog signal of the operation code forwarded from the demodulation/modulation circuit, the transmitter transmits the operation code to the external display by using a radio transmission medium. Upon selecting the external display mode in the state that the digital camera is set to the cradle unit or, alternatively, upon sending the operation code from the remote controller in the same state, the operation code is sent to the external display to put it in an external input condition for displaying an image thereon.

In the digital camera system according to the first embodiment, it is possible to easily carry out the operation for displaying the image on the external display.

In the digital camera system according to the second embodiment, it is possible to easily carry out the operation for displaying the image on the external display. In addition, it is possible to reduce a number of parts of the cradle unit and it is also possible to lower the cost of the system as a whole.

In the digital camera system according to the third embodiment, the operation for displaying the image on the external display may be easily carried out by merely operating the remote controller.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
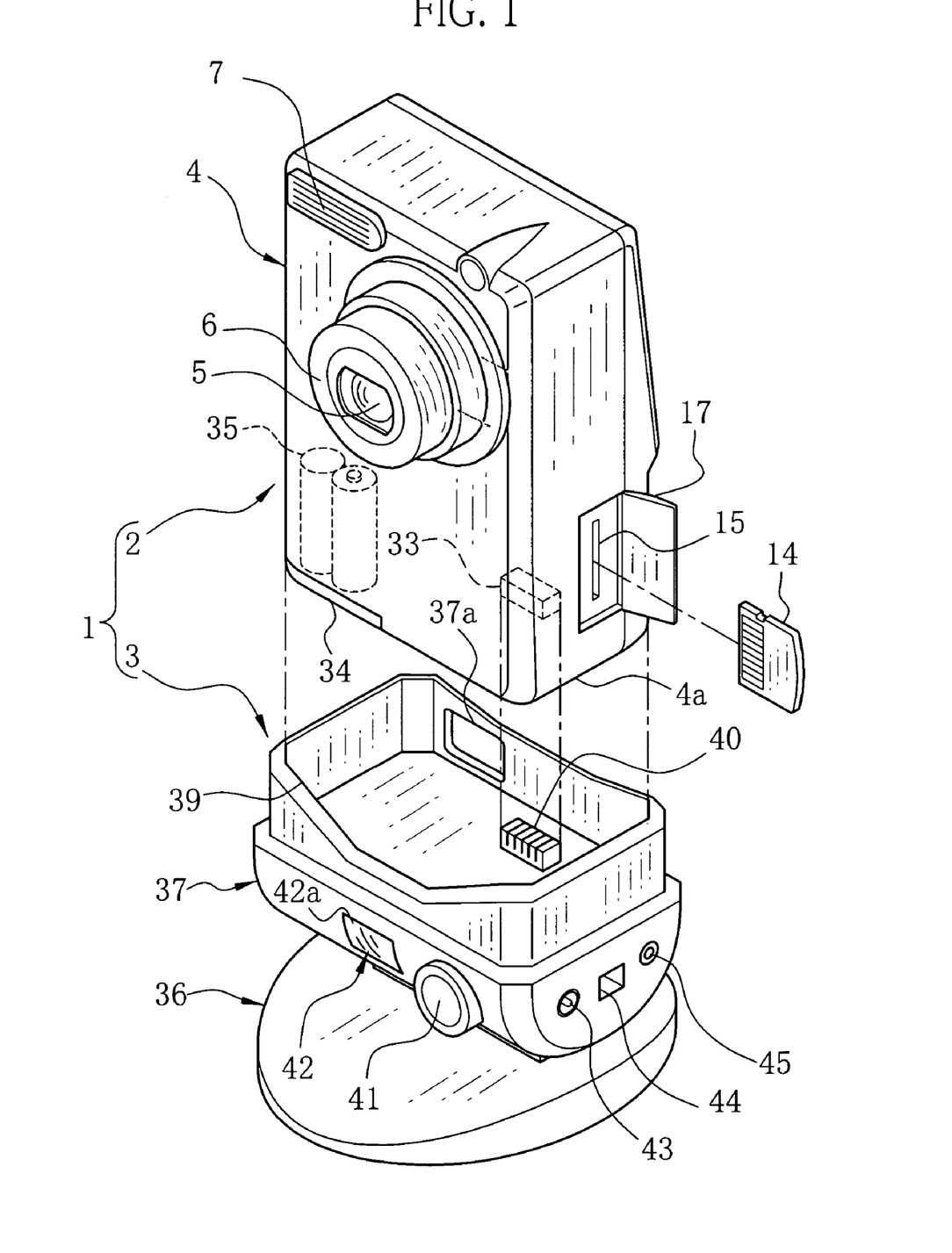
FIG. 1 is a front perspective view showing a digital camera system according to the present invention.
Figure 2:
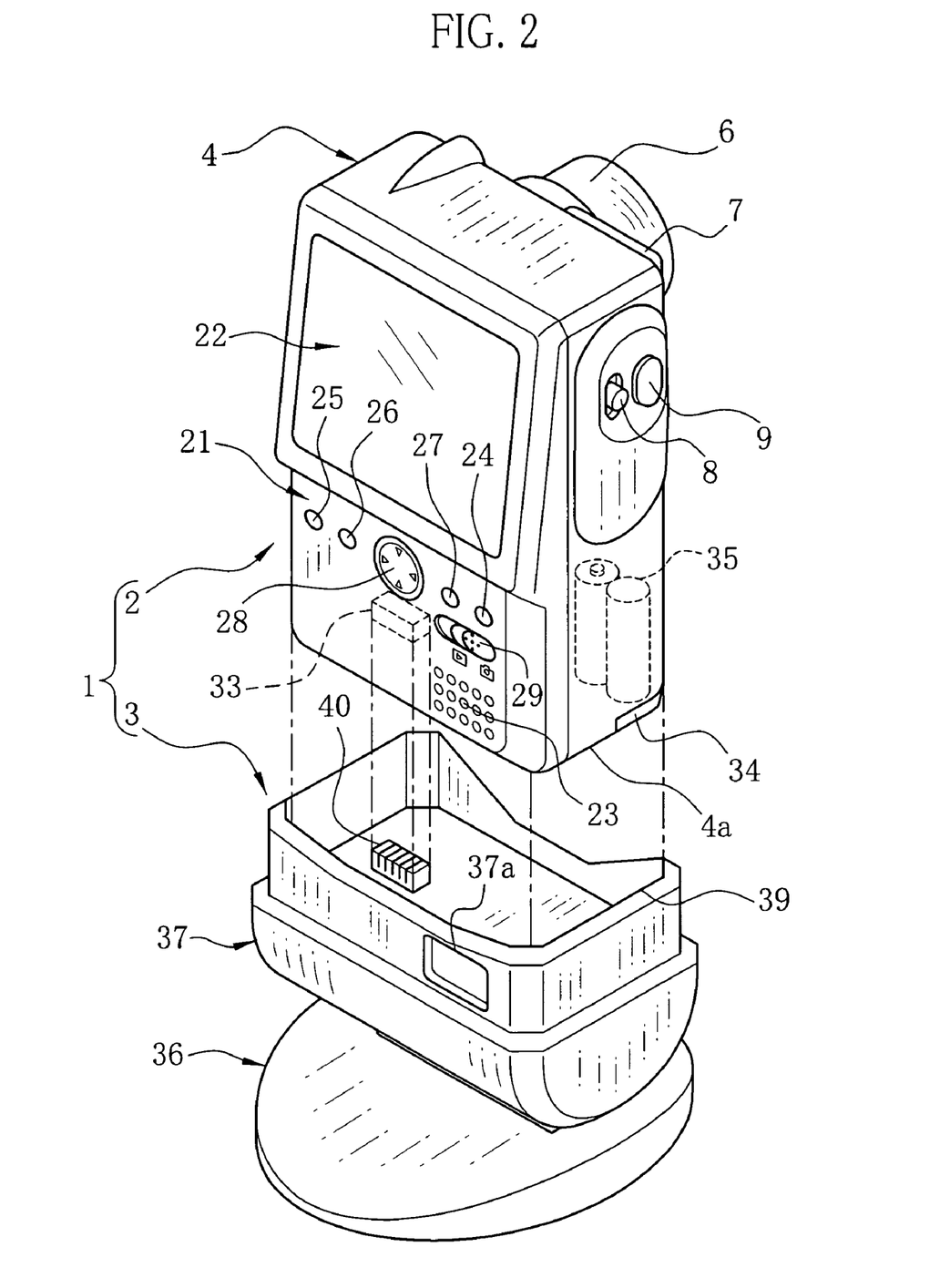
FIG. 2 is a rear perspective view showing the digital camera system.

FIGS. 1 and 2 show a structure of a digital camera system 1 according to the present invention. The digital camera system 1 comprises a portable digital camera 2 to be carried by a user, and a cradle unit 3 to which the digital camera 2 is set. A front face of a camera body 4 of the digital camera 2 is provided with a lens barrel 6 and a flash emitting portion 7. The lens barrel 6 contains a taking lens 5, and the flash emitting portion 7 emits the flashlight toward a subject. A left side of the camera body 4 is provided with a shutter button 8 to be used for a shutter releasing operation, a zoom button 9 and so forth.

The other side of the camera body 4 is provided with a card slot 15 to which a memory card 14 is removably set. Behind the card slot 15, is incorporated a media controller 16 (see FIG. 3), which is described later. Upon setting the memory card 14 to the card slot 15, the memory card 14 is electrically connected to the media controller 16. The card slot 15 is protected by an openable protect cover 17 in order to prevent entry of dust and so forth.

The back of the camera body 4 is provided with an operational section 21, an image-displaying LCD 22, a speaker 23 and so forth. The LCD 22 functions as both of a viewfinder and a display member for a taken picture. The operational section 21 is provided with a power-supply button 24 for turning on and off the power supply, operation buttons 25 to 27, a cross-directional key 28, and a mode-changing button 29. A selective operation for modes of the digital camera 2 is carried out by operating the mode-changing button 29. As the modes of the digital camera 2, there are a photography mode, a data transfer mode, an external display mode and so forth. Upon selection of the data transfer mode, image data recorded in the memory card 14 is read out and is transferred to an apparatus externally connected to the digital camera 2. Meanwhile, upon selection of the external display mode, the image data is outputted to the external display connected to the digital camera 2 so that the image is shown on the external display.

The other various operations are carried out by operating the respective operation buttons 25 to 27 alongside the cross-directional key 28. The speaker 23 reproduces a sound in synchronism with image display under a reproduction mode.

A bottom portion 4a of the camera body 4 is provided with a connector 33 and a battery lid 34. The connector 33 is formed in a concave shape so as not to protrude from a periphery of the digital camera 2. The battery lid 34 is openably attached to the bottom portion 4a. When the battery lid 34 is opened, it is possible to access an internal battery chamber. The battery chamber is loaded with a battery 35 being as a chargeable secondary battery.

The cradle unit 3 is joined to the digital camera 2 to connect an AC power supply, an external apparatus of the PC and so forth, and an external display of the TV monitor and so forth. The cradle unit 3 comprises a pedestal portion 36 and a cradle body 37. The cradle body 37 is formed in a parallelepiped box shape, and an upper portion thereof is formed with an attachment 39 to which the digital camera 2 is set.

The attachment 39 is formed in a concave shape corresponding to the periphery of the bottom portion 4a of the camera body 4. By placing the bottom portion 4a in the attachment 39 so as to make the positions thereof coincide, the digital camera 2 is positioned at a predetermined angle and is supported.

A connection terminal 40 is provided inside the attachment 39. When the digital camera 2 is set to the attachment 39, the connection terminal 40 is fitted into the connector 33 provided in the digital camera 2 to electrically connect the digital camera 2 to the cradle unit 3. This cradle unit 3 functions not only as a station for stably holding the digital camera 2 but also as a terminal for charging the electrically-connected digital camera 2 and for intervening between the digital camera 2 and an external apparatus. When placing the digital camera 2, the cradle unit 3 also functions as a tripod for keeping the digital camera 2 toward a subject.

The front of the cradle body 37 is provided with a power-supply button 41 for turning on and off the power supply of the digital camera 2 connected to the cradle unit 3. The front of the cradle body 37 is further provided with a light emitter 42 comprising a transparent cover 42a and a light-emitting element 42b (see FIG. 3). The transparent cover 42a is fitted to the cradle body 37, and the light-emitting element 42b is disposed behind the transparent cover 42a. Incidentally, an LED (Light Emitting Diode), which emits infrared rays, is used as the light-emitting element 42b.

One side of the cradle body 37 is provided with an AC power-supply connector 43, a Universal Serial Bus (USB) connector 44, and a video output connector 45. The AC power-supply connector 43 is connected to an AC power-supply adaptor to supply a DC power. The USB connector 44 being as a data output port is connected to the external apparatus of the PC and so forth. The video output connector 45 being as an external-display output port outputs composite signals of NTSC and so forth to a monitor and a video deck. These connectors 43 to 45 are connected to the connection terminal 40 inside the cradle unit 3. Meanwhile, the back of the cradle body 37 is formed with an opening 37a through which the speaker 23 of the digital camera 2 is exposed.

The cradle body 37 is rotatable relative to the pedestal portion 36. In virtue of this, it is possible to adjust an inclination of the digital camera 2 set to the attachment 39 of the cradle body 37.

Figure 3:
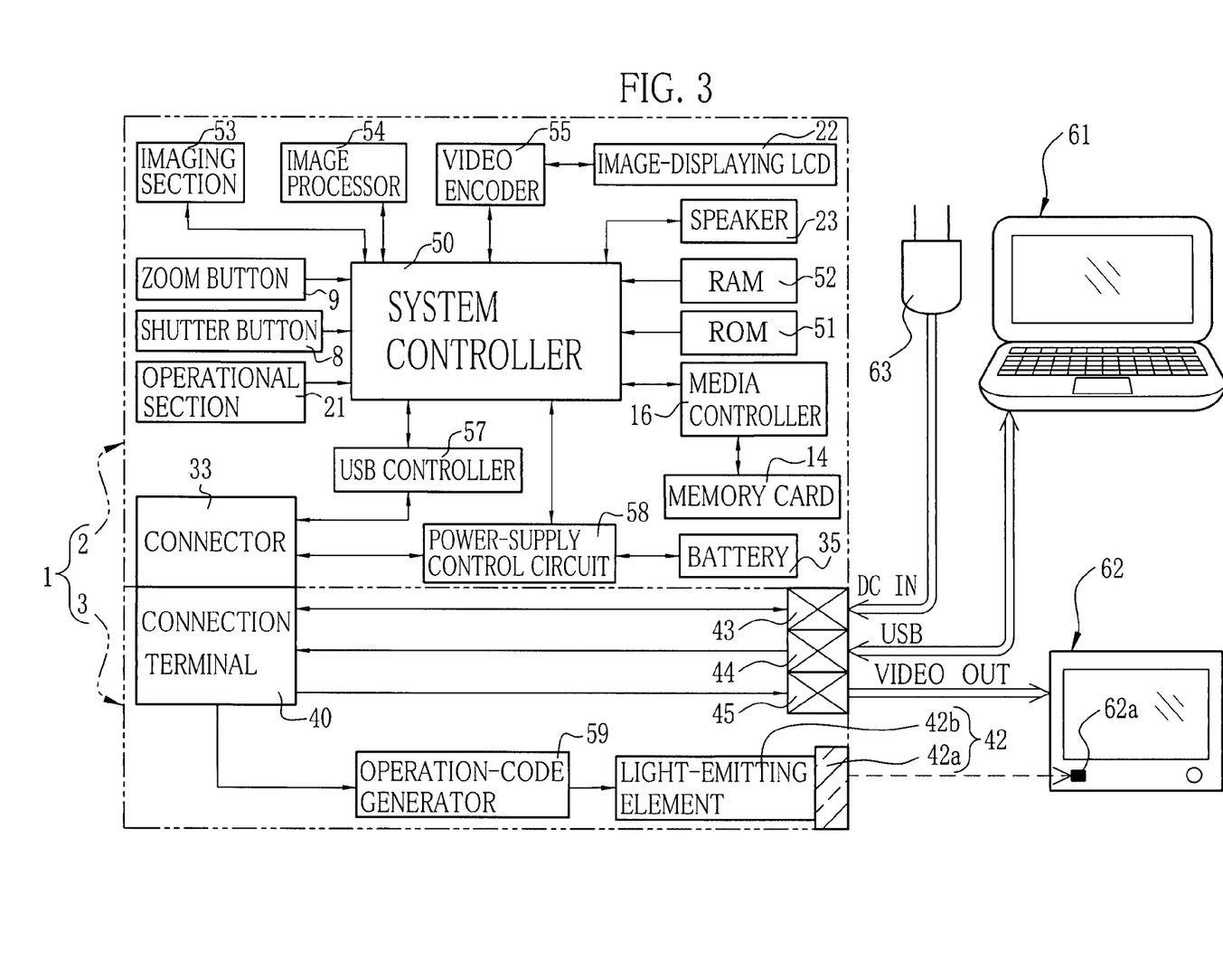
FIG. 3 is a block diagram showing an electrical structure of the digital camera system.

FIG. 3 is a block diagram showing an electrical structure of the digital camera 2 and the cradle unit 3. The digital camera 2 comprises a system controller 50, which controls the respective sections of the digital camera 2 in block in accordance with each of operation signals inputted from the shutter button 8, the zoom button 9 and the operational section 21.

A ROM 51 stores various control programs, setting information and so forth. The system controller 50 loads the information from the ROM 51 to a PAM 52, which is a work memory, to execute various processes. As to the RAM 52, is used a SDRAM (Synchronous Dynamic Random Access Memory), for instance.

Under the photography mode, a picture is taken by an imaging section 53 upon depression of the shutter button 8. Photographed image data is recorded in the memory card 14. The imaging section 53 comprises the taking lens 5, a CCD image sensor, a lens moving mechanism for zooming and focusing, a stop changing mechanism and so forth.

The CCD image sensor photoelectrically converts the subject light into an analog image signal as well known. The analog image signal is converted into digital data by an A/D converter, and is temporarily written in the RAM 52. For the image data written in the RAM 52, an image processor 54 carries out various image-quality corrections of gamma correction, sharpness correction, contrast correction and so forth. After that, the processed data is compressed in a compression style of JPEG and so forth. The compressed image data is written in the memory card 14 by the media controller 16.

Under the reproduction mode, the image is read out of the memory card 14 and is expanded in the image processor 54. After that, a resize process is executed to produce image data to be used for display. This image data has a small pixel number and is written in a VRAM area of the RAM 52. A video encoder 55 converts the image data to be used for the display to an analog composite signal, which is outputted to the LCD 22 for displaying the image. Owing to this, the image is reproduced on the LCD 22.

In the meantime, the system controller 50 is connected to a USB controller 57 and a power-supply control circuit 58. One line of the USB controller 57 is connected to the system controller 50, and the other line thereof is connected to the connector 33. When the connector 33 is connected to the connection terminal 40, the USB controller 57 confirms a connection state of them and controls data transfer between the external apparatus and the digital camera 2. USB standard is one of normal communication interfaces intervening between the PC and a peripheral apparatus thereof.

The power-supply control circuit 58 distributes the DC power, which is supplied from the cradle unit 3 and the battery 35 removably set to the digital camera 2, to the respective sections of the digital camera 2.

The connection terminal 40 of the cradle unit 3 is connected to an operation-code generator 59 in addition to the AC power-supply connector 43, the USB connector 44 and the video output connector 45. In this embodiment, the USB connector 44 is connected to a personal computer (PC) 61, and the video output connector 45 is connected to a TV monitor 62. Further, the AC power-supply connector 43 is connected to an AC power-supply adaptor 63 to supply the DC power.

An output side of the operation-code generator 59 is connected to the light emitter 42, and an input side thereof is connected to the connection terminal 40. This operation-code generator 59 is an analog circuit, which generates an operation code as an analog signal when a control signal has been inputted from the digital camera 2. The operation code is used for operating the TV monitor 62. When the analog signal of the operation code is sent from the operation-code generator 59 to the light emitter 42, the light-emitting element 42b of the light emitter 42 emits an infrared signal in accordance with the operation code.

Figure 4:
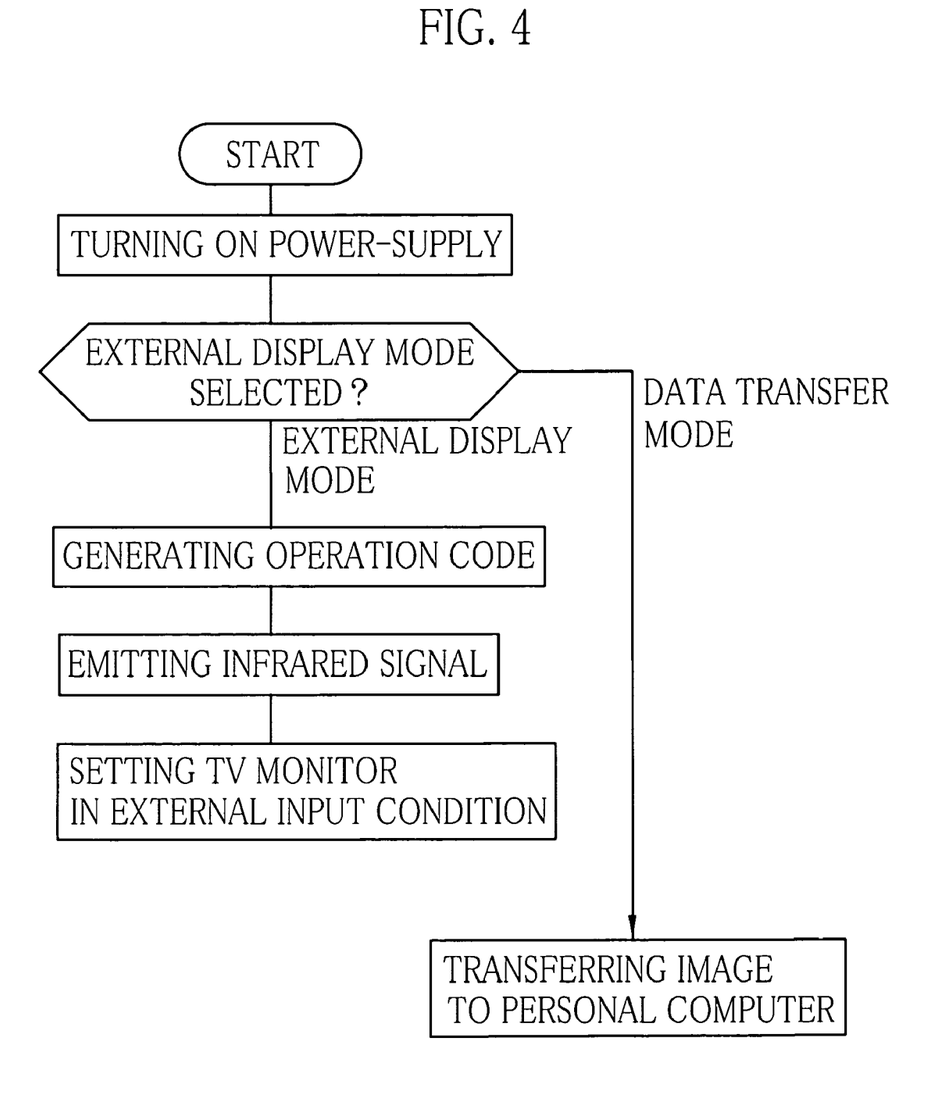
FIG. 4 is a flowchart showing a process, which is executed when an external-display mode is selected in the digital camera.

An operation of this embodiment is described below, referring to a flowchart shown in FIG. 4. The digital camera 2 is set on the cradle unit 3. The power supply is turned on by operating the power-supply button 24 in a state that the PC 61 and the TV monitor 62 are connected. Upon selecting the external display mode in this state by operating the mode-changing button 29, an operation signal for activating the operation-code generator 59 is sent via the connector 33 and the connection terminal 40. The activated operation-code generator 59 generates the operation code to be used for setting the TV monitor 62 in an external input condition. The generated operation code is outputted to the light emitter 42. In accordance with the operation code sent from the operation-code generator 59, the light emitter 42 emits the infrared signal. The TV monitor 62 is set in the external input condition when the infrared signal is received by a light receiver 62a thereof. An image outputted from the video output connector 45 is displayed on a screen of the TV monitor 62. Incidentally, in a case that the external display mode is not selected and the data transfer mode is selected, the image data is transferred between the PC 61 and the digital camera 2 via the connection terminal 40 and the USB connector 44. In this way, when the external display mode is selected in the digital camera 2, it is possible to easily display the image without taking much time for operating the TV monitor 62.

In the above first embodiment, the cradle unit 3 is provided with the operation-code generator 59 and the light emitter 42, and the operation code is sent from the light emitter 42 in accordance with the analog signal forwarded from the operation-code generator 59. However, the present invention is not exclusive to this embodiment. The operation-code generator may be provided in the digital camera 2. Hereinafter, is described a second embodiment of the present invention in which the digital camera 2 is provided with an operation-code generator. A digital camera system 71 of the second embodiment has a structure shown in FIG. 5. By the way, in FIG. 5, a component identical with that of the first embodiment is denoted by the same reference numeral, and description thereof is abbreviated.

Figure 5:
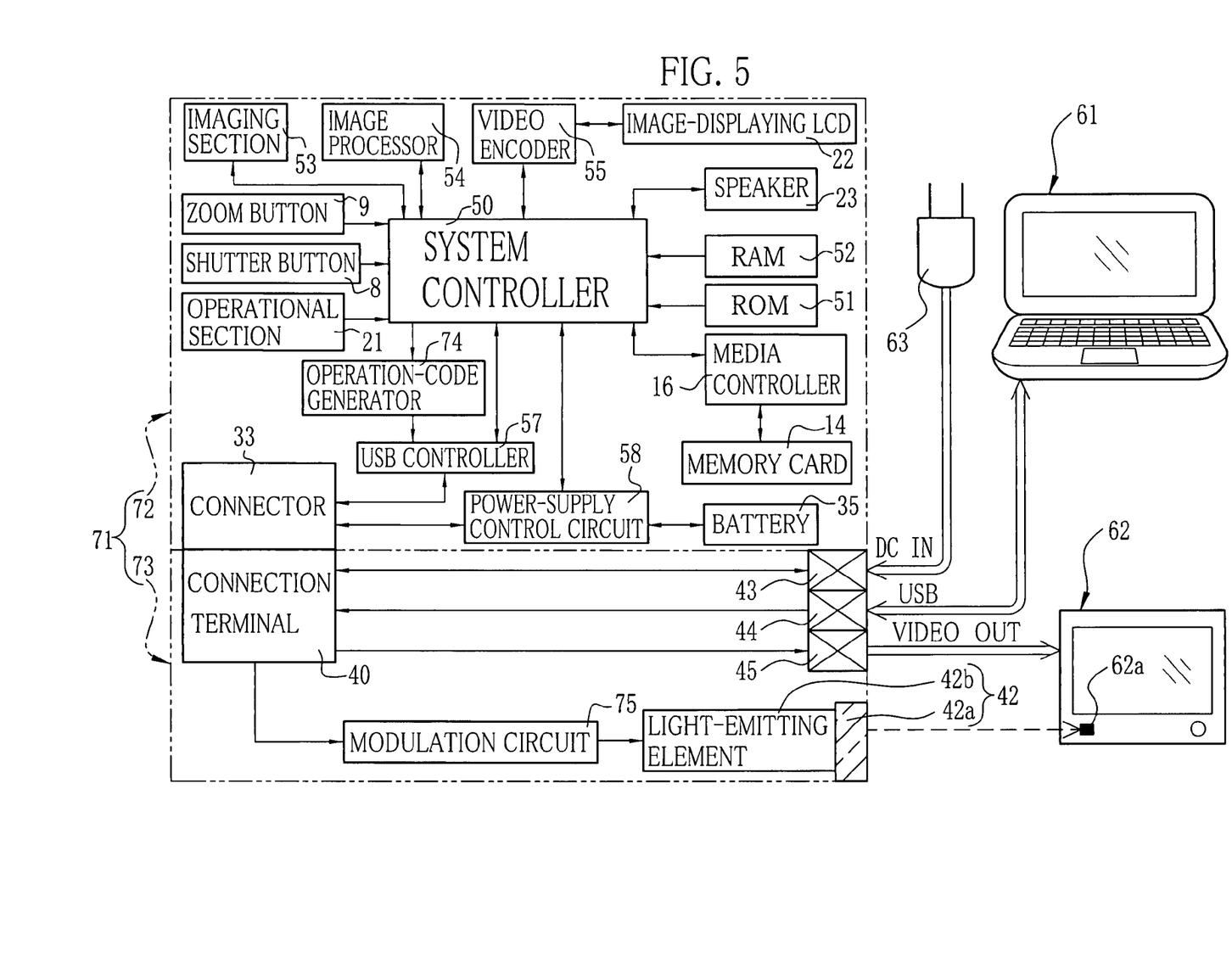
FIG. 5 is a block diagram showing an electrical structure of a digital camera system according to a second embodiment.

The digital camera system 71 of this embodiment comprises a digital camera 72 and a cradle unit 73. The system controller 50 of the digital camera 72 is connected to an operation-code generator 74, which outputs an operation code as digital data. The operation code is used for operating the TV monitor 62. An output side of the operation-code generator 74 is connected to the USB controller 57. The digitized operation code is transferred to the cradle unit 73 via the connector 33 and the connection terminal 40.

The cradle unit 73 is provided with a modulation circuit 75 for converting the digitized operation code from the digital data to an analog signal. An input side of the modulation circuit 75 is connected to the connection terminal 40, and an output-side thereof is connected to the light emitter 42. An operation of this structure is described below, referring to a flowchart shown in FIG. 6.

Figure 6:
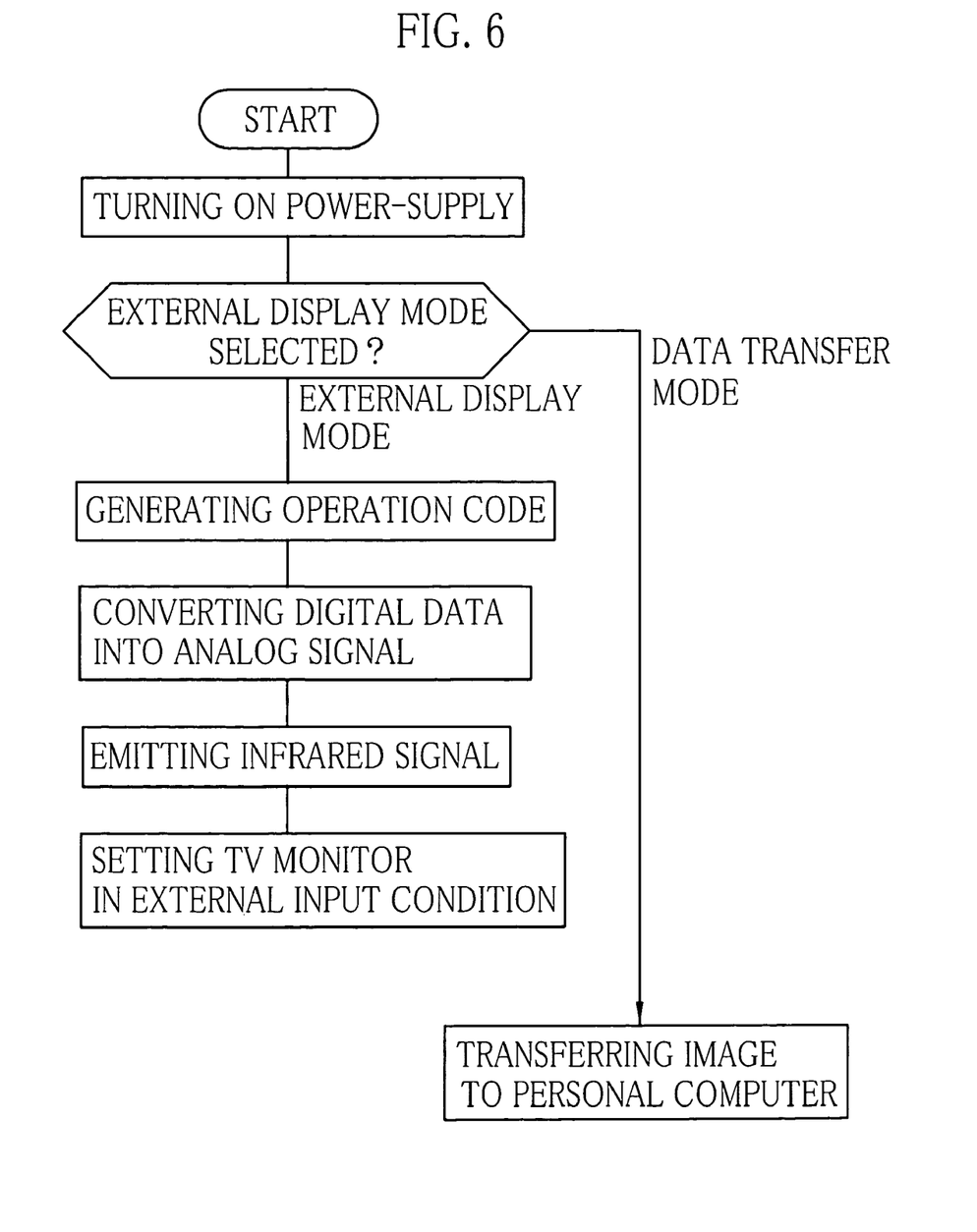
FIG. 6 is a flowchart showing a process, which is executed when an external-display mode is selected in the digital camera system of the second embodiment.

The digital camera 72 is set on the cradle unit 73. The power-supply is turned on by operating the power-supply button 24 in a state that the PC 61 and the TV monitor 62 are connected. Upon selecting the external display mode by operating the mode-changing button 29 in this state, the system controller 50 activates the operation-code generator 74 to generate the operation code as the digital data for putting the TV monitor 62 in the external input condition. The operation code is outputted from the USB controller 57 to the cradle unit 73 via the connector 33 and the connection terminal 40. The modulation circuit 75 of the cradle unit 73 converts the digitized operation code, which is forwarded from the operation-code generator 74, into the analog signal to output it to the light emitter 42. In accordance with the operation code sent from the modulation circuit 75, the light emitter 42 emits the infrared signal. The TV monitor 62 is set in the external input condition when the infrared signal is received by the light receiver 62a thereof. In this way, when the external display mode is selected in the digital camera 72, it is possible to easily display the image without taking much time for operating the TV monitor 62. Further, since the operation-code generator 74 having a complex circuit structure is provided inside the digital camera 72, it is possible to form the operation-code generator 74 on a common circuit board on which other electronic parts constituting the digital camera 72 are mounted. Alternatively, the operation-code generator 74 may be formed on a common IC chip including the system controller and so forth. The cradle unit 73 is merely provided with the modulation circuit 75 having a simple circuit structure so that it is possible to lower the cost of the digital camera system as a whole in comparison with the first embodiment.

In the above first and second embodiments, almost all of the operations are performed with the operational members provided on the digital camera. The present invention, however, is not exclusive to these embodiments. A structure including a remote controller may be adopted. The remote controller sends an operation code to be used for operating the digital camera. Hereinafter, is described a third embodiment of the present invention in which the remote controller is provided. A digital camera system 81 of the third embodiment has a structure shown in FIG. 7. In this drawing, a component identical with that of the first and second embodiments is denoted by the same reference numeral, and description thereof is abbreviated.

Figure 7:
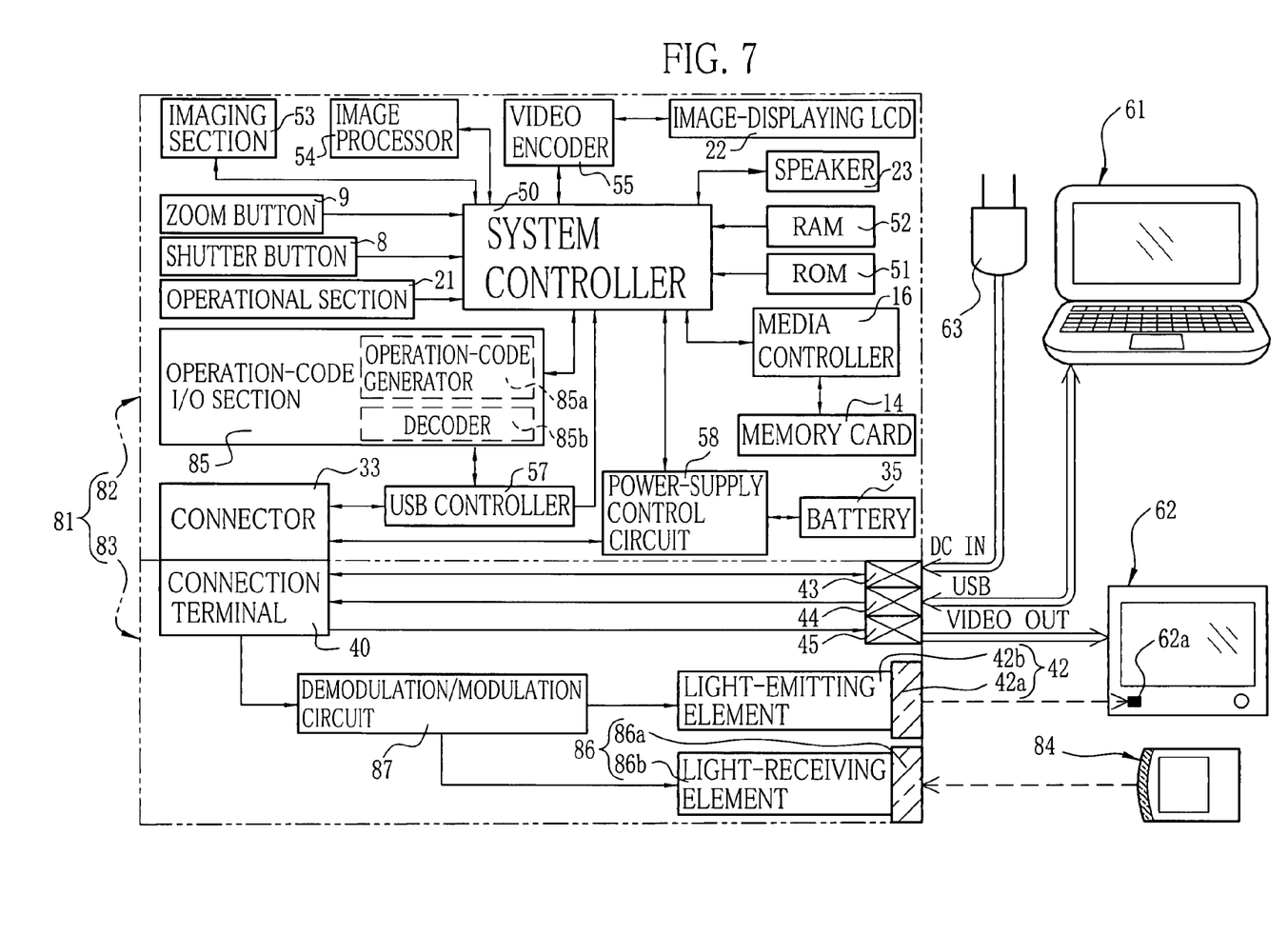
FIG. 7 is a block diagram showing an electrical structure of a digital camera system according to a third embodiment.

The digital camera system 81 of this embodiment comprises a digital camera 82, a cradle unit 83 and a remote controller 84. The system controller 50 of the digital camera 82 is connected to an operation-code I/O (input-output) section 85 functioning not only as an operation-code generator 85a but also as a decoder 85b. The operation-code generator 85a outputs digital data of the operation code to be used for operating the TV monitor 62. The decoder 85b converts an operation code of externally-inputted digital data into a control signal for controlling the respective sections of the digital camera 82. The operation-code I/O section 85 is connected to the USB controller 57 to send the digitized operation code to the cradle unit 83 via the connector 33 and the connection terminal 40.

The cradle unit 83 is provided with a light receiver 86 and a demodulation/modulation circuit 87. The light receiver 86 comprises a transparent cover 86a fitted to the cradle body, and a light-receiving element 86b disposed behind the transparent cover 86a. The light receiver 86 receives an infrared signal of the operation code, which is sent from the remote controller 84, to output an analog signal. Incidentally, a photo sensor is used as the light-receiving element 86b. The demodulation/modulation circuit 87 converts the digitized operation code from the digital data to an analog signal and converts the operation code, which is received by the light receiver 86, from the analog signal to digital data. One side of the demodulation/modulation circuit 87 is connected to the connection terminal 40, and the other side thereof is connected to the light emitter 42 and the light receiver 86. An operation of this structure is described below, referring to a flowchart shown in FIG. 8.

Figure 8:
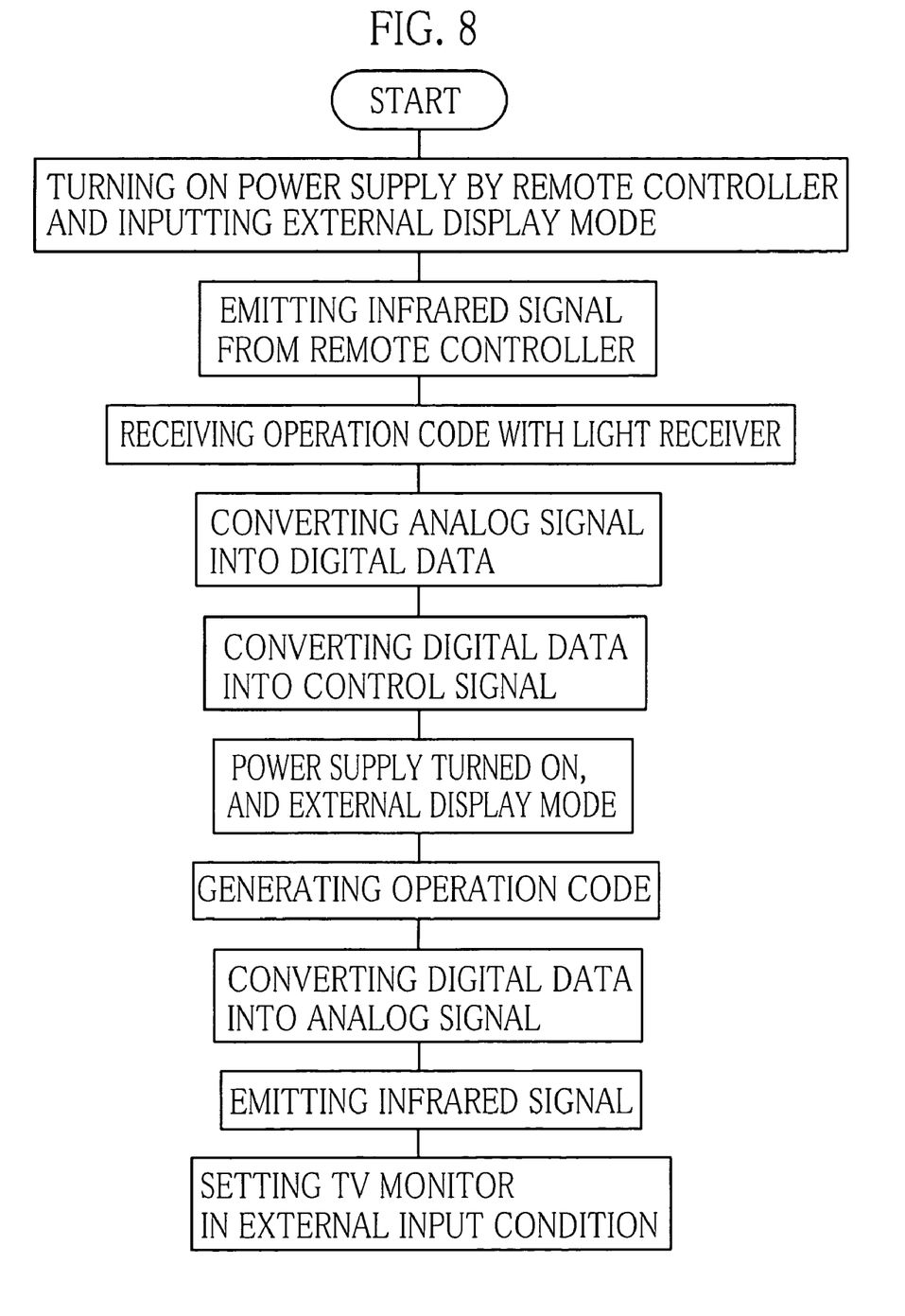
FIG. 8 is a flowchart showing a process, which is executed when an external-display mode is selected in the digital camera system of the third embodiment.

The digital camera 82 is set to the cradle unit 83. An ON-state of the power supply is selected by operating the remote controller 84 in a state that the PC 61 and the TV monitor 62 are connected. And at the same time, the external display mode is selected on the basis of the mode selection. Upon selecting the ON-state of the power supply and the external display mode, the remote controller 84 emits the infrared signals in accordance with the operation codes of the selections.

The light receiver 86 receives the infrared signal emitted from the remote controller 84 to output the analog signal in accordance with the operation code. The demodulation/modulation circuit 87 converts the analog signal of the operation code into the digital data and sends it to the digital camera 82 via the connection terminal 40 and the connector 33. In the digital camera 82 to which the operation code of the digital data has been sent, the decoder 85b of the operation-code I/O section 85 converts the operation code of the digital data into the control signal for turning on the power supply and for selecting the external display mode. On the basis of the control signal, the system controller 50 turns on the power supply of the digital camera 82 and changes the mode selection to the external display mode. Upon selecting the external display mode, the system controller 50 activates the operation-code generator 85a to generate the digital data of the operation code for setting the TV monitor 62 in the external input condition. And then, the digital data is outputted from the USB controller 57 to the cradle unit 83 via the connector 33 and the connection terminal 40. The demodulation/modulation circuit 87 of the cradle unit 83 converts the digitized operation code, which is sent from the operation-code generator 85a, into the analog signal. The converted analog signal is outputted to the light emitter 42. Successively, the light emitter 42 emits the infrared signal in accordance with the operation code sent from the demodulation/modulation circuit 87. By receiving the infrared signal with the light receiver 62a, the TV monitor 62 is set in the external input condition. In this way, when the external display mode is selected in the digital camera 82, it is possible to easily display the image without taking much time for operating the TV monitor 62. Further, it is possible to easily carry out the changing operation in comparison with the case in that the operational section 21 of the digital camera 82 is operated. This is because operation buttons of the remote controller 84 are merely operated when a user carries out the above operations. Incidentally, in this embodiment, the mode selection and the power supply of the digital camera 82 are changed only by using the remote controller 84. However, the operations may be carried out with the operational section 21 similarly to the forgoing first and second embodiments.

In the foregoing first to third embodiments, the operation code for setting the TV monitor 62 is sent by using the infrared signal. Moreover, the infrared signal from the remote controller 84 is received. However, radio transmission medium for sending and receiving the operation code is not exclusive to the infrared rays. Radio waves corresponding to transmission styles of Bluetooth, IEEE802 and so forth may be utilized, for instance. Alternatively, ultrasonic waves may be utilized.

In the foregoing first to third embodiments, the operation-code generator merely generates the operation code to be used for putting the TV monitor in the external input condition, and the operation code is sent from the light emitter 42. The present invention, however, is not exclusive to this.

Before generating the operation code for the external input condition, another operation code for turning on the power supply of the TV monitor 62 may be generated. After sending this operation code from the light emitter 42 to turn on the power supply of the TV monitor 62, the operation code for the external input condition may be sent.

By the way, the operation code for operating the TV monitor 62 working as an external display member is different in accordance with each manufacturer. In view of this, it is preferable to provide a function for registering the operation code corresponding to each of the manufacturers. An operation for the registration is preferable to be carried out by inputting through the operational section 21 and an external apparatus connected to the digital camera system. The external apparatus to be connected to the digital camera system is not exclusive to the PC, and may be a cellular phone, a personal digital assistant (PDA) and so forth. The external display member is not exclusive to the TV monitor, and may be a device for displaying an image, for instance, a projector and a liquid crystal display. Regarding the connection interface standard relative to the external apparatus, the USB is described as an example. However, other standards of IEEE1394 and so forth may be employed.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A digital camera system comprising a digital camera and a cradle unit, said digital camera being capable of selecting one of modes including a data transfer mode for transferring image data to an external apparatus and an external display mode for displaying the image data on external display means; said cradle unit comprising a receiving portion on which said digital camera is received, a connection terminal to be connected to said digital camera upon receiving said digital camera, a power-supply portion for supplying an electric power to said digital camera, a data output port for transferring said image data to said external apparatus, and an external-display output port for outputting said image data to said external display means, said digital camera system comprising:

an operation-code generator provided in said cradle unit, said operation-code generator generating an operation code for operating said external display means; and a transmitter provided in said cradle unit, said transmitter sending said operation code to said external display means in a wireless manner, and said operation code being sent so as to put said external display means in an external input condition, under which the image is able to be displayed, when said digital camera placed in said cradle unit selects said external display modes, wherein when the external display means receives the operation code, the external display means selects to receive data from an external input apparatus.

2. A digital camera system according to claim 1, wherein said operation-code generator generates said operation code as an analog signal.

3. A digital camera system according to claim 2, wherein said transmitter comprises:

a transparent cover fitted to said cradle unit; and a light emitting element disposed inside said transparent cover, said light emitting element being connected to said operation-code generator to emit an infrared signal in accordance with the analog signal of said operation code.

4. A digital camera system according to claim 3, wherein said light emitting element is an infrared light emitting diode.

5. A digital camera system according to claim 4, wherein said external display means is one of a TV monitor, a projector and a liquid crystal display.

6. A cradle unit for a digital camera, said digital camera being capable of selecting one of modes including a data transfer mode for transferring image data to an external apparatus and an external-display mode for displaying the image data on external display means, said cradle unit comprising:

a receiving portion for receiving said digital camera;

a connection terminal to be connected to said digital camera; a power-supply portion for supplying an electric power to said digital camera;

a data output port for transferring said image data to said external apparatus;

an external-display output port for outputting said image data to said external display means;

an operation-code generator for generating an operation code for operating said external display means;

a transmitter for sending said operation code to said external display means in a wireless manner, said operation code being sent so as to put said external display means in an external input condition, under which the image is able to be displayed, when said digital camera placed in said receiving portion is set to the external display mode, wherein when the external display means receives the operation code, the external display means selects to receive data from an external input apparatus.

7. A digital camera system according to claim 1, wherein an input side of the operation code generator is connected to the connection terminal.

8. A digital camera system according to claim 1, wherein when said digital camera placed in said cradle unit selects said external display mode, an operation signal for activating the operation code generator is sent through the connection terminal.

9. A digital camera system according to claim 1, wherein when the external display means receives the operation code, the external display means selects to receive the image data from the digital camera through a video output connector of the cradle unit, wherein the video output connector is connected to the external display means.

10. A digital camera system according to claim 1, wherein the external display means selects receive National Television System Committee (NTSC) composite signals from the external input apparatus.

11. A digital camera system according to claim 1, wherein the cradle unit transmits the operation code through a light emitter and transmits that image data through a video connector, wherein the light emitter and the video connector are different.

12. A digital camera system according to claim 1, wherein the operation code turns on power supply of the external display means.

* * * * *